(12) United States Patent
Scholz et al.

(10) Patent No.: US 10,780,383 B2
(45) Date of Patent: Sep. 22, 2020

(54) SUPPLY AIR ARRANGEMENT FOR A MOBILE DEVICE

(71) Applicant: Carl Freudenberg KG, Weinheim (DE)

(72) Inventors: Tobias Scholz, Viernheim (DE); Oliver Kurtz, Rauenberg (DE); Ulrich Stahl, Laudenbach (DE); Anette Arnold, Seeheim-Jugenheim (DE); Volker Braeunling, Heppenheim (DE); Judith Hemmerling, Bretten (DE)

(73) Assignee: CARL FREUDENBERG KG, Weinheim (DE)

( * ) Notice: Subject to any disclaimer, the term of this patent is extended or adjusted under 35 U.S.C. 154(b) by 268 days.

(21) Appl. No.: 15/901,905

(22) Filed: Feb. 22, 2018

(65) Prior Publication Data

US 2018/0250621 A1    Sep. 6, 2018

(30) Foreign Application Priority Data

Mar. 6, 2017  (EP) .................................. 17159370

(51) Int. Cl.
*B01D 46/00* (2006.01)
*B01D 46/52* (2006.01)
(Continued)

(52) U.S. Cl.
CPC ..... *B01D 46/0023* (2013.01); *B01D 46/0008* (2013.01); *B01D 46/521* (2013.01); *B01D 53/0407* (2013.01); *B60H 3/0608* (2013.01); *B60H 3/0658* (2013.01); *B01D 2253/102* (2013.01); *B01D 2253/108* (2013.01); *B01D 2253/3425* (2013.01); *B01D 2257/302* (2013.01); *B01D 2257/40* (2013.01); *B01D 2257/406* (2013.01); *B01D 2257/708* (2013.01);
(Continued)

(58) Field of Classification Search
CPC ............ B01D 46/0008; B01D 46/0023; B01D 46/521; B01D 53/0407; B01D 2253/102; B01D 2253/108; B01D 2253/3425; B01D 2257/302; B01D 2257/40; B01D 2257/406; B01D 2257/708; B01D 2259/4566; B01D 2279/40; B60H 3/0658; B60H 3/0608; B60H 2003/0691
USPC ......... 55/385.3, 315; 96/134, 136, 139, 142, 96/154; 123/198 E
See application file for complete search history.

(56) References Cited

U.S. PATENT DOCUMENTS 4,629,479 A * 12/1986 Cantoni .................. F24F 13/28
                                                    96/55
4,925,468 A    5/1990 Kishi et al.
(Continued)

FOREIGN PATENT DOCUMENTS

DE    3834942 A1    4/1989
DE    4105724 A1    9/1992
(Continued)

*Primary Examiner* — Frank M Lawrence, Jr.
(74) *Attorney, Agent, or Firm* — Leydig, Voit & Mayer, Ltd.

(57) ABSTRACT

A supply air arrangement for a mobile device includes: at least one inlet; at least one air duct; at least one outlet; and a filtering arrangement comprising at least two filtering elements. A first filtering element and a second filtering element that is formed separately from the first filtering element are arranged in the air duct.

11 Claims, 3 Drawing Sheets

(51) Int. Cl.
*B01D 53/04* (2006.01)
*B60H 3/06* (2006.01)

(52) U.S. Cl.
CPC .. *B01D 2259/4566* (2013.01); *B01D 2279/40* (2013.01); *B60H 2003/0691* (2013.01)

(56) References Cited

U.S. PATENT DOCUMENTS

| | | | | |
|---|---|---|---|---|
| 5,256,103 | A * | 10/1993 | Abthoff | B60H 3/0625 454/139 |
| 5,562,407 | A * | 10/1996 | Cielo | B01D 46/0023 415/121.2 |
| 5,613,991 | A * | 3/1997 | Esaki | B01D 46/0006 454/158 |
| 6,152,990 | A * | 11/2000 | Allen | B01D 53/02 95/107 |
| 6,464,761 | B1 * | 10/2002 | Bugli | F02M 35/024 123/198 E |
| 2002/0139251 | A1 * | 10/2002 | Simmons | B60H 3/0608 96/134 |
| 2003/0066427 | A1 * | 4/2003 | Ishida | B01D 46/0023 96/135 |
| 2004/0031248 | A1 * | 2/2004 | Lindsay | B01D 46/0023 55/385.3 |
| 2008/0168902 | A1 * | 7/2008 | Suzuki | B01D 53/0407 96/109 |
| 2009/0301308 | A1 * | 12/2009 | Leister | B01D 39/163 96/142 |

FOREIGN PATENT DOCUMENTS

| | | |
|---|---|---|
| DE | 20306250 U1 | 5/2004 |
| EP | 3015155 A1 | 5/2016 |
| FR | 3016954 A1 | 7/2015 |
| JP | 2841140 B2 | 12/1998 |
| JP | 2000326724 A | 11/2000 |
| JP | 2001070420 A * | 3/2001 |
| JP | 2004305395 A | 11/2004 |

* cited by examiner

SUPPLY AIR ARRANGEMENT FOR A MOBILE DEVICE

CROSS-REFERENCE TO PRIOR APPLICATION

Priority is claimed to European Patent Application No. EP 17 159 370.0, filed on Mar. 6, 2017, the entire disclosure of which is hereby incorporated by reference herein.

FIELD

The invention relates to a supply air arrangement for a mobile device, comprising an inlet, at least one air duct, an outlet and a filtering arrangement comprising at least two filtering elements.

BACKGROUND

The use of filtering arrangements for treating the air inside motor vehicle cabins is known. EP 3 015 155 A1 discloses a filtering arrangement, in which the filtering tasks of adsorption filtration and particle filtration are combined in one filter. In this case, the filtering layer formed as the particle filter traps particle constituents from the supply air, such as dust and pollen. The filtering layer formed as the adsorption filter traps unwanted gaseous constituents from the supply air, such as noxious gases, odors, benzene and ozone.

When the filtering element is formed as a filter for the interior of mobile devices, the filtering functions have therefore thus far been combined in a single component. This is disadvantageous since only filtering functions can be combined that, depending on the construction, can be arranged in a single filtering element.

SUMMARY

In an embodiment, the present invention provides a supply air arrangement for a mobile device, comprising: at least one inlet; at least one air duct; at least one outlet; and a filtering arrangement comprising at least two filtering elements, wherein a first filtering element and a second filtering element that is formed separately from the first filtering element are arranged in the air duct.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
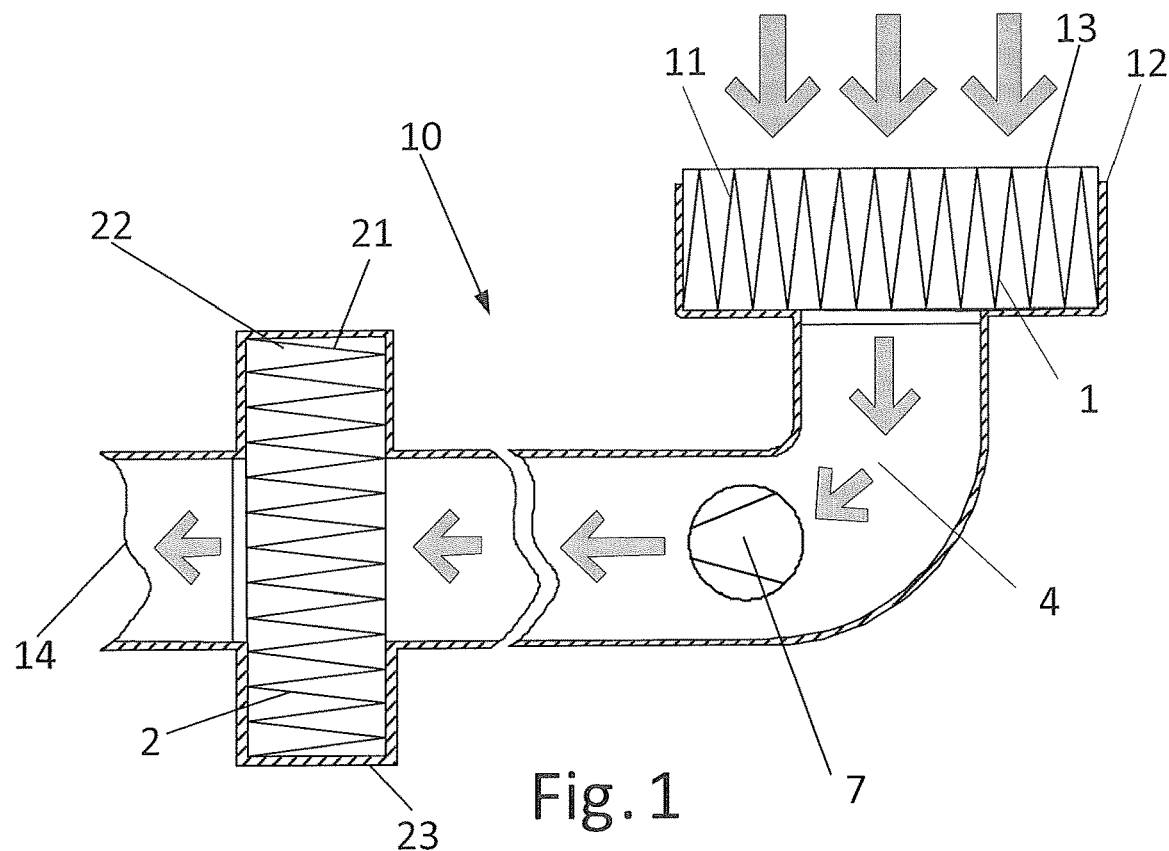
FIG. 1 is a schematic view of a supply air arrangement comprising a two-stage filtering arrangement.

The supply air arrangement according to the invention for a mobile device comprises an inlet, at least one air duct, an outlet and a filtering arrangement comprising at least two filtering elements, a first filtering element and a second filtering element that is formed separately from the first filtering element being arranged in the air duct.

This separates the functions of the filtering elements arranged in the air duct, and so every filtering element can be optimally adapted to the filtering task assigned to said filtering element. The filtering elements connected in series provide very effective treatment of the supply air through the filtering arrangement.

The filtering arrangement can comprise at least three filtering elements. According to another embodiment, the filtering arrangement can comprise at least four filtering elements. This makes it possible to use specialized filtering elements in the air duct, and therefore a number of completely different filtering tasks can be achieved by the filtering arrangement. In this case, it is in particular not necessary for the filtering elements to be collectively mounted and housed in a common installation space. Instead, the filtering elements can be distributed in the air duct. In this case, the filtering elements can also be adapted to the available space. Some filtering elements can be tubular, for example, for this purpose.

At least one filtering element can be formed as a particle filter. A particle filter traps accompanying particulate substances of different sizes.

Within the context of the present invention, particle filters can be coarse particle filters and/or fine particle filters.

A fine particle filter is a folded filter that is particularly efficient at separating small and miniscule particles. Small and miniscule particles include, for example, particle fractions of classes PM1 and PM2.5. The dust or particle fraction classed as fine dust (PM1) contains 50% of the particles having a diameter of 1.0 μm, a larger number of smaller particles and a smaller number of larger particles. The dust or particle fraction classed as fine dust (PM2.5) contains 50% of the particles having a diameter of 2.5 μm, a higher number of smaller particles and a lower number of larger particles. The fine particle filter is equipped to separate particles of dust fractions PM1 and PM2.5.

In such particle filters, it is advantageous for the coarse particles to be previously trapped by a prefilter. In this case, the fine particles such as fine dust can be trapped by a folded filter, which is specially designed for efficient filtration capacity.

By forming the folded filter advantageously and separately, the drop in pressure can be reduced to a minimum and the filtration capacity can be simultaneously increased. By designing a fine particle filter to be separated from an adsorption filter, the air quality in the vehicle cabin is considerably improved, which is a major advantage in particular for those with allergies.

By simultaneously using a prefilter and a fine particle filter, the service life of a fine particle filter can be significantly increased. In this case, the prefilter is exposed to the coarse particles, while the fine particle filter is only exposed to the small and fine particles. This takes the strain off of the fine particle filter and increases its service life.

In this case, an advantageous particle filter is formed as a folded filter, comprising at least one layer made of a fleece material. Folded filters made of fleece material are inexpensive and have a high filtration capacity due to the comparatively large filtering surface area.

At least one filtering element can be formed as an adsorption filter. An adsorption filter traps unwanted gaseous constituents from the supply air, for example noxious gases, odors, benzene or ozone.

Within the context of the present invention, adsorption filters can be combi filters, honeycomb filters, adsorptive fillers, impregnated foam and/or zeolites.

In particular, folded combi filters, which can have excellent adsorption properties in addition to potential particle filtration properties, can be used as the adsorption filter. In general, filter fleeces that are provided with an additional activated carbon layer are referred to as combi filters. For the purpose of stabilization, another filter fleece is often provided as a cover layer, and therefore the activated carbon layer is integrated in filtering layers in the form of a sandwich.

If in particular small drops in pressure together with a high adsorption capacity are to be achieved, honeycomb filters, also known as honeycombs, can also be used as the adsorption filter. Such honeycomb filters provided with channels can also function as acoustic absorption elements. A filter of this type has particularly low air resistance. At the same time, the plurality of channels delimited by channel walls provide a large filtration surface area, which produces a particularly high gas filtration capacity. The desired air resistance and the desired gas adsorption capacity of a honeycomb filter can be particularly effectively adapted to the specific use. For this purpose, the outer dimensions, the length and number of channels and the cross-sectional area of the channels can be modified.

The honeycomb filter can be formed in segments, a plurality of segments in the shape of honeycomb bodies being retained in a retaining frame and being fitted together form a honeycomb filter.

In this case, the honeycomb filter preferably comprises activated carbon. The honeycomb filter can be made entirely of activated carbon. Alternatively, it is also conceivable to mix activated carbon with other sorptive materials. In this case, in particular the use of silica is conceivable. Activated carbon or mixtures of activated carbon and silica are mixed with a binding agent and shaped to form a honeycomb filter. Such filters have a high filtration capacity for removing unwanted gaseous constituents.

An advantageous honeycomb body or honeycomb filter comprises at least 55 wt. % activated carbon. Furthermore, the honeycomb filter can contain accompanying substances. Advantageous accompanying substances are, for example, glassy carbon and/or aluminosilicate. The cell density of the honeycomb body, i.e. the number of channels per unit of area, is preferably between 10 and 120 cells/cm$^2$, particularly preferably between 40 and 95 cells/cm$^2$.

According to another embodiment, the adsorption filter can also be formed as an adsorptive filler. This is advantageous in particular when volumes are to be filled that are difficult to use as a result of other structures. The adsorptive filler can be used as a passive adsorption mass in this case, through which the supply air does not flow and which prevents a significant increase in the pressure difference. Alternatively, the supply air can actively flow through adsorptive filler, similarly to a conventional combi filter.

The adsorption filter can also be designed as an impregnated foam. This embodiment is advantageous in particular if only one flat filtering element can be installed for space reasons. In addition to the adsorptive properties, the advantage of the impregnation agent can then be employed in the case of comparatively low pressure losses.

When used in areas having high air humidity or large temperature and air humidity fluctuations, it is advantageous for the adsorption filter to be designed as a zeolite structure.

In this embodiment, the desorption of unwanted gases from adsorbents is reduced and the climate inside the mobile device is stabilized.

A filtering element can be formed as a prefilter. In this case, the prefilter is preferably connected in series with a particle filter. The prefilter increases the efficiency of the filtering arrangement. The prefilter can be formed as a coarse particle filter, a filter mat, a snow separator, an inertial separator, a fly screen or a leaf screen in this case.

Folded coarse particle filters are preferably used as the prefilter. These separate coarse dust particles and thereby prevent premature clogging of the filtering elements arranged downstream.

In the event of narrow installation spaces, which do not provide enough room for folded coarse particle filters, flat filter mats that assume the function of coarse dust separation can also be used as the prefilter.

When used in areas of frequent snowfall, it is advantageous for the prefilter to be formed as a snow separator. Such a prefilter prevents snow and ice from entering the air duct and therefore also the additional downstream filtering elements. A prefilter formed as a snow separator can ensure that, even in the event of heavy snowfall, the cabin is sufficiently ventilated.

In another embodiment, the prefilter can be formed as an inertial separator. This is advantageous in particular when a high content of coarse dust in the supply air has to be expected. The inertial separator can reliably separate coarse dust particles without leading to a significant increase in the pressure differential.

The prefilter can also be formed as a fly screen or leaf screen. This is advantageous if there is no space available for a larger prefilter. Fly screens or leaf screens can advantageously be designed as an injection-molded component, which is directly integrated in the air duct and therefore does not take up additional space.

A filtering element can be formed as a functional filter. In addition to one or more of the above-described filtering elements, a customized filtration solution is possible for a mobile device.

Within the context of the invention, functional filtering elements can be anti-allergen filters, scented filters, VOC filters, $NO_x$ filters, $SO_2$ filters, $NH_3$ filters, aldehyde filters, HEPA filters, electrostatic filters or an electric filter.

A functional filter can advantageously be formed as an anti-allergen filter, which gets its anti-allergenic effect by being impregnated with a fruit acid. According to an advantageous embodiment, the impregnation is applied to a fleece layer, for example to a carrier layer or to a cover layer of a combi filter. In this case, the filter can be formed as a folded filter.

In another embodiment, the functional filter can be formed as a filter having a scenting effect, the scenting effect being achieved by the use of strong-smelling additives. The scenting effect can be designed so as to correspond to individual customer requirements.

A functional filter can have a higher adsorption capacity for VOCs—volatile organic compounds—, specifically gaseous organic hydrocarbons, in particular on account of the use of specific adsorbents. In particular, materials that have a large inner surface area and contain zeolites or activated carbon granules are suitable therefor.

In addition, a functional filter can have a higher adsorption capacity for nitrogen oxides ($NO_x$) on account of specific impregnation of the adsorbents.

A functional filter can also have a higher adsorption capacity for acidic gases such as $SO_2$ on account of the use of alkaline adsorbents.

Another functional filter can be provided by using adsorbents impregnated with phosphoric acid or sulfuric acid, which filter thus has a higher adsorption capacity for ammonia ($NH_3$).

A functional filter can also be characterized by a higher adsorption capacity for aldehydes, which is achieved by means of a specific adsorbent.

In another embodiment, the functional filter can be characterized by being made of an HEPA filtering material, which allows it to achieve the highest separation rates and to remove aerosols from the supply air.

In another embodiment, the functional filter can be formed as an electrostatic filter. Here, an applied voltage generates an electric field, which electrically charges particles and therefore allows for increased particle separation.

In another embodiment, the functional filter can be formed as an electrostatic filter. Here, by means of an applied voltage, an electrical field is generated, which electrically charges particles and then deflects them in the direction of the electrodes and separates them.

The functional filter can also be formed as a honeycomb filter comprising channels.

By separating, in a targeted manner, the function of the various filtering elements into a prefilter, a particle filter, an adsorption filter and a functional filter, it is possible to specifically adapt the filtration capacity to the particular specific filtering task and to optimally meet the requirements of the individual stages.

In this case, the filtering elements are formed separately from one another and mounted in the air duct at a spacing from one another. An advantageous filtering arrangement having four filtering elements comprises a prefilter, a particle filter, an adsorption filter and a functional filter, which are formed separately from one another and are mounted in the air duct at a spacing from one another. As a result, the functions of the various filtration tasks are separated, and so the filtering elements can be designed independently of one another. In this case, it is in particular not necessary to design the filtering element formed as the adsorption filter such that said filtering element is joined together with the filtering element formed as the particle filter in order to form a single filtering element. In this regard, the second filtering element can be designed such it allows a high filtration capacity of the air flow passing through when there is a small drop in pressure.

The air duct can comprise at least one outflow, a filtering element, preferably a filtering element formed as the adsorptive filter, being assigned to the outflow. In this case, it is advantageous for gaseous constituents, which can lead to an odor nuisance, to be removed directly upstream of the outflow so that gaseous constituents that are first emitted inside the mobile device are also removed.

In this case, the filtering element can form a flow straightener. In particular when the filtering element is formed as a honeycomb filter, the supply air is homogenized when it passes through the comparatively long channels of the honeycomb filter. By straightening the flow, noise is reduced and therefore noise emissions by the supply air duct are reduced.

An air-conveying unit can be arranged in the air duct. In this case, filtering elements of the filtering arrangement can be arranged, either on their own or in groups, upstream and/or downstream of the air-conveying unit when viewed in the direction of flow.

In this embodiment, it is advantageous for particles such as dust and pollen that are transported in the supply air to be trapped by the first filtering element. An additional filtering element removes gaseous constituents from the supply air. These also include gaseous constituents that are emitted by the air-conveying unit. This can, for example, be ozone generated by the electric motor of the air-conveying unit. In an advantageous air duct, when viewed in the direction of flow, a first filtering element is arranged upstream of the air-conveying unit, and a second filtering element is arranged downstream of the air-conveying unit. In this case, the first filtering element is formed as a particle filter and the second filtering element is formed as an adsorption filter.

The evaporator of an air-conditioning device can be arranged in the air duct. In this case, when viewed in the direction of flow, at least one filtering element can be arranged upstream of the evaporator and, when viewed in the direction of flow, at least one filtering element can be arranged downstream of the evaporator in the air duct. This makes it possible, for example, to filter any accompanying substances emitted by the evaporator. Furthermore, filtering elements arranged upstream of the evaporator can prevent unwanted substances from accumulating on the evaporator.

The air duct can comprise a first air duct for the supply air and a second air duct for the recirculated air. In this case, individual filtering elements or a plurality of separate filtering elements can be provided for each air duct. Furthermore, filtering elements can be provided that carry out filtration for both air ducts at the same time. When filtering the recirculated air, it is important in particular to remove substances emitted from the interior of the mobile device, whereas, when filtering the supply air, removal of noxious gases is also desirable. Therefore, in an advantageous embodiment of the second filtering element, different filtering elements are provided for the supply air and the recirculated air.

Furthermore, the filtering arrangement can also comprise a filtering element arranged in the cabin of the mobile device. In this case, it is in particular conceivable for the filtering element arranged in the cabin to be a passive filtering element. In contrast to active filtering elements, the supply air does not actively pass through a passive filtering element. In this embodiment, the flow of air reaches the outlet of the air duct only after passing through the cabin.

The mobile device can be a motor vehicle. In this embodiment, the supply air arrangement is equipped to provide treated supply air for ventilating the cabin of the motor vehicle.

FIG. 1 shows a supply air arrangement 10 for a mobile device, comprising an air-conveying unit 7 and comprising at least one first filtering element 1 and one second filtering element 2, which are arranged in an air duct 4 of the mobile device.

The first filtering element 1 is formed as a particle filter in the form of a folded filter. The folded filter comprises at least one layer 11 made of a fleece material. The first filtering element 1 is replaceably arranged in a filter housing 12 that is part of the air duct 4.

The second filtering element 2 is formed as an adsorption filter. In this embodiment, the second filtering element 2 is also a folded filter, comprising a cover layer 21 made of a fleece material and an activated carbon layer 22. The second filtering element 2 is replaceably arranged in a second filter housing 23 that is part of the air duct 4.

The first filtering element 1 and the second filtering element 2 are formed separately from one another and are mounted in the air duct 4 at a spacing from one another. In this case, the first filtering element 1 is arranged in the air duct 4 on the inflow side and prevents particle impurities from entering the air duct 4 and the cabin of the mobile device. The second filtering element 2 is arranged in the air duct 4 on the outflow side and prevents unwanted gaseous accompanying substances from entering the cabin of the mobile device.

In this embodiment, the mobile device is a motor vehicle.

Figure 2:
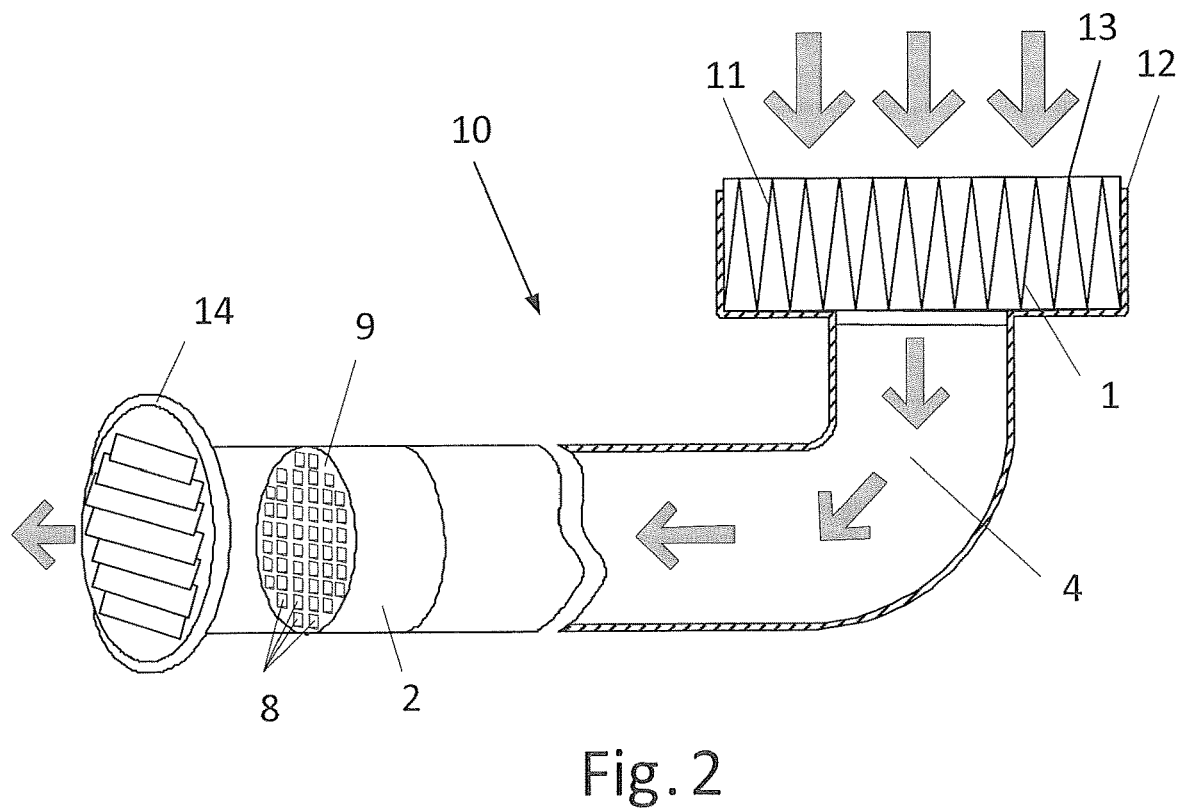
FIG. 2 is a schematic view of a supply air arrangement comprising a two-stage filtering arrangement.

FIG. 2 shows a supply air arrangement 10 for a mobile device, comprising an inlet 13, an air duct 4, an outlet 14 and a filtering arrangement comprising a first filtering element 1 and a second filtering element 2. In this case, the first filtering element 1 and the second filtering element 2 are formed separately and are spaced apart from one another in the air duct 4.

The first filtering element 1 is formed as a particle filter. In this case, the first filtering element 1 is a folded filter, comprising at least one layer 11 made of a fleece material. The first filtering element 1 is replaceably arranged in a filter housing 12 that is part of the air duct 4.

The second filtering element 2 is formed as an adsorption filter. The second filtering element 2 is formed as a honeycomb filter. The honeycomb filter comprises one or more honeycomb bodies, which comprise a plurality of channels 8 that are delimited by channel walls 9. The honeycomb filter provided is composed of a plurality of honeycomb bodies in a segmented manner. The honeycomb bodies are fixed in a retaining frame, the retaining frame being designed such that it forms a sealing surface with respect to the filter housing.

In an alternative embodiment, the honeycomb bodies can be fitted together form a honeycomb filter by being integrally bonded to one another. Furthermore, the sealing surface can alternatively be provided in the air duct 4.

In the present embodiment, the second filtering element 2 comprises activated carbon. In order to produce said second element, activated carbon is shaped into a honeycomb shape by means of extrusion. The second filtering element 2 is cylindrical and inserted into the tubular air duct in the form of an insert.

In an advantageous embodiment, the retaining frame is tubular and is arranged in the tubular air duct of an air-conditioning unit, in particular a mobile air-conditioning unit. In this case, the air duct often has a round or rectangular cross section, and therefore the retaining frame is accordingly round or rectangular.

The first filtering element 1 is arranged in the air duct 4 on the inflow side and prevents particle impurities from entering the air duct and the cabin of the mobile device. The second filtering element 2 is arranged in the air duct 4 on the outflow side and prevents unwanted gaseous accompanying substances from entering the cabin of the mobile device.

In order to ventilate the cabin of the mobile device, the air duct 4 comprises a plurality of outflows as the outlet 14. In this case, a second filtering element 2 is assigned to each outflow. The second filtering element 2, formed as a honeycomb filter, forms a flow straightener and reduces outflow noise of the air duct 4.

The second filtering element 2 is also replaceably arranged in the air duct 4.

In an alternative embodiment, the second filtering element 2, in particular in the form of a honeycomb filter, can form an integral unit together with the outflow and is also designed to last for the operating life of the mobile device.

Figure 3:
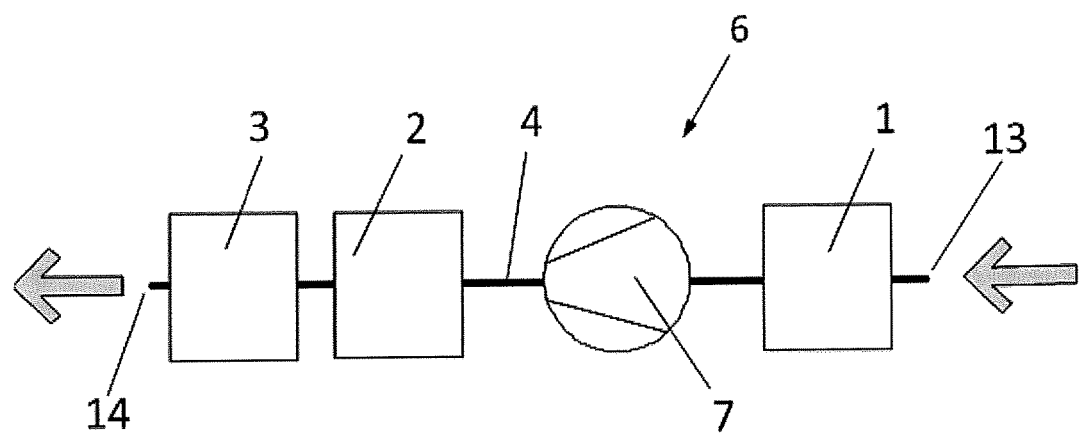
FIG. 3 is a schematic view of a supply air arrangement comprising a three-stage filtering arrangement.

FIG. 3 shows a supply air arrangement 10 comprising an air-conditioning device 6 for a mobile device that comprises an air-conveying unit 7, and comprising at least one first filtering element 1, one second filtering element 2 and one third filtering element 3, which are arranged in an air duct 4 of the mobile device.

When viewed in the direction of flow, the first filtering element 1 is arranged upstream of the air-conveying unit 7, while the second filtering element 2 and the third filtering element 3 are arranged downstream of the air-conveying unit 7 when viewed in the direction of flow. Furthermore, another evaporator of the air-conditioning device 6 is arranged between the first filtering element 1 and the second filtering element 2.

The first filtering element 1 is formed as a particle filter. When viewed in the direction of flow, a third filtering element 3 is arranged downstream of the second filtering element 2. In this case, the first filtering element 1 forms a fine particle filter, the second filtering element 2 forms an adsorption filter and the third filtering element 3 forms a functional filter. The third filtering element 3 is formed as a folded filter similarly to the first filtering element 1, and is replaceably arranged in the air duct 4.

The second filtering element 2 formed as an adsorption filter is also replaceably arranged in the air duct 4. The second filtering element 2 is formed as a honeycomb filter. In this case, a honeycomb filter consists of at least one honeycomb body, but can also be composed of a plurality of honeycomb bodies. A honeycomb body comprises a plurality of channels delimited by channel walls. The honeycomb body is, in turn, composed of partial segments. The honeycomb bodies are fixed in a retaining frame, the retaining frame being designed such that it forms a sealing surface with respect to the filter housing.

In a suitably designed air duct, the honeycomb filter can be installed without a retaining frame. In this embodiment, the sealant is assigned to the air duct.

In the present embodiment, the second filtering element 2 comprises activated carbon. In order to produce said second element, activated carbon is shaped into a honeycomb shape by means of extrusion. The second filtering element 2 is inserted into the tubular air duct in the form of an insert.

In an advantageous embodiment, the retaining frame is tubular and is arranged in the tubular air duct of an air-conditioning system, in particular a mobile air-conditioning system. In this case, the air duct often has a round or rectangular cross section, and therefore the retaining frame is accordingly round or rectangular.

In the present application example, the third filtering element 3 is formed as an anti-allergen filter and as a folded filter. This filtering element comprises at least one first layer made of a fleece material and at least one activated carbon layer, the anti-allergen effect being produced by impregnating the first layer of fleece material with fruit acid.

Figure 4:
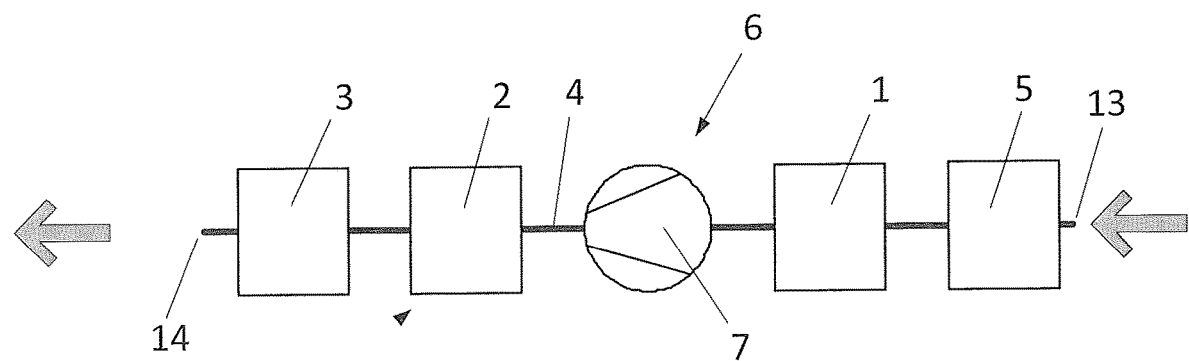
FIG. 4 is a schematic view of a supply air arrangement comprising a four-stage filtering arrangement.

FIG. 4 shows a supply air arrangement 10 according to FIG. 3, but comprising four filtering elements 1, 2, 3, 5. In this respect, the filtering arrangement according to FIG. 4 comprises a first filtering element 1, a second filtering element 2, a third filtering element 3 and a fourth filtering element 5, which are arranged in an air duct 4 of the mobile device.

In the embodiment according to FIG. 4, the first filtering element 1 is formed as a fine particle filter, the second filtering element 2 is formed as a honeycomb filter and the third filtering element 3 is formed as an anti-allergen filter. The filtering arrangement is supplemented by the fourth filtering element 5, which is arranged upstream of the first filtering element 1 when viewed in the direction of flow.

In the present embodiment, the fourth filtering element 5 assumes the function of a prefilter and is designed as a snow separator.

By means of the additional use of a snow separator, the system is reliably protected against snow that is sucked in, which cannot reach the first filtering element 1. Therefore, there is no risk of the function of one of the downstream filtering elements being adversely affected by melting snow.

Figure 5:
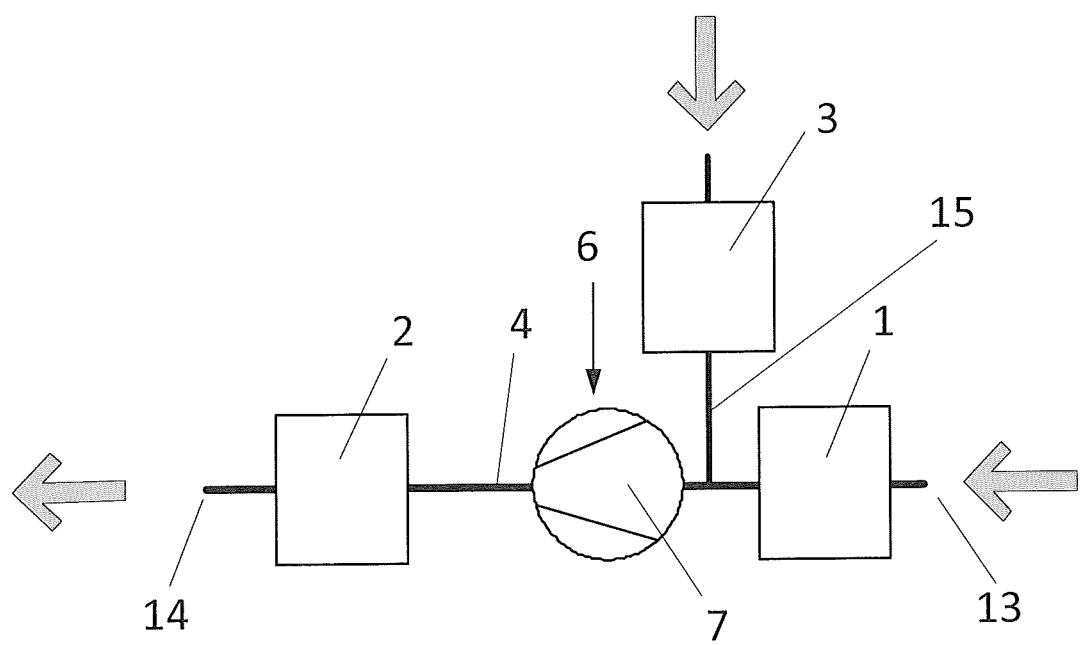
FIG. 5 is a schematic view of a supply air arrangement comprising a recirculated air duct.

FIG. 5 shows a supply air arrangement 10 for a mobile device, comprising an air-conditioning device 6 having an air-conveying unit 7, and comprising at least one first filtering element 1 and one second filtering element 2, which are arranged in an air duct 4 of the mobile device. In addition, a third filtering element 3 is provided in a recirculated air duct 15, which opens into the air duct 4 downstream of the first filtering element 1 and upstream of the air-conveying unit 7. In this respect, the supply air arrangement 10 according to FIG. 5 comprises two flow ducts. One air duct 4 conducts outside air into the interior of the mobile device. A recirculated air duct 15 conducts air that is drawn out of the interior of the mobile device back into the interior.

As in the embodiment according to FIG. 2, the first filtering element 1 is formed as a folded filter and the second filtering element 2 is formed as a combi filter. In this respect, in this embodiment the first filtering element 1 is a particle filter. The second filtering element 2 is, in contrast, a combined particle filter and adsorption filter. The third filtering element 3 arranged in the recirculated air duct 15 is formed as a fine particle filter.

In this case, the third filtering element 3 is arranged in the recirculated air duct 15 and reduces the particles present in the interior of the vehicle or the particles present in the cabin of the mobile device during the air-recirculation mode of the air-conditioning device 6. In this embodiment, the second filtering element 2 assumes the filtration task for both the regular air duct 4, which filtration firstly takes place by means of the first filtering element 1, and the recirculated air duct 15, which filtration firstly takes place by means of the third filtering element 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A supply air arrangement for a mobile device, comprising:
   at least one inlet;
   at least one air duct;
   at least one outlet; and
   a filtering arrangement comprising at least four filtering elements,
   wherein a first filtering element of the at least four filter elements, a second filtering element of the at least four filter elements, a third filtering element of the at least four filter elements, and a fourth filtering element of the at least four filter elements are formed separately from one another and are arranged in the at least one air duct, spaced apart from one another,
   wherein an evaporator of an air-conditioning device is arranged in the at least one air duct,
   wherein, when viewed in a direction of flow, at least one filtering element is arranged upstream of the evaporator in the at least one air duct and at least one filtering element is arranged downstream of the evaporator in the at least one air duct, and
   wherein at least one filtering element comprises a prefilter comprising a coarse particle filter, a filter mat, a snow separator, an inertial separator, a fly screen, or a leaf screen.

2. The supply air arrangement according to claim 1, wherein at least one filtering element comprises a particle filter.

3. The supply air arrangement according to claim 1, wherein at least one filtering element comprises an adsorption filter.

4. The supply air arrangement according to claim 1, wherein at least one filtering element comprises a functional filter.

5. The supply air arrangement according to claim 3, wherein at least one filtering element comprises a honeycomb filter comprising channels and channel walls.

6. The supply air arrangement according to claim 1, wherein an air-conveying unit is arranged in the at least one air duct.

7. The supply air arrangement according to claim 6, wherein, when viewed in a direction of flow, at least one filtering element is arranged upstream of the air-conveying unit in the at least one air duct, and
   wherein, when viewed in the direction of flow, at least one filtering element is arranged downstream of the air-conveying unit in the at least one air duct.

8. The supply air arrangement according to claim 1, wherein at least one filtering element is assigned to the at least one inlet and at least one filtering element is assigned to the at least one outlet of the at least one air duct.

9. The supply air arrangement according to claim 1, wherein the at least one air duct comprises a first air duct and a recirculated air duct, and
   wherein the first air duct is provided for supply air and the recirculated air duct is provided for recirculated air.

10. The supply air arrangement according to claim 9, wherein at least one filtering element is assigned to the recirculated air duct.

11. The supply air arrangement according to claim 1, wherein the mobile device comprises a motor vehicle.

* * * * *